March 10, 1959 J. J. NYBERG 2,877,448

SUPERCONDUCTIVE LOGICAL CIRCUITS

Filed Nov. 8, 1957

James J. Nyberg
INVENTOR.

BY Robert H. Fraser
ATTORNEY 2,877,448
Patented Mar. 10, 1959

2,877,448

SUPERCONDUCTIVE LOGICAL CIRCUITS

James J. Nyberg, Torrance, Calif., assignor, by mesne assignments, to Thompson Ramo Wooldridge Inc., Cleveland, Ohio, a corporation of Ohio Application November 8, 1957, Serial No. 695,430

13 Claims. (Cl. 340—173)

This invention relates to superconductive logical circuits, and more particularly to a new and improved superconductive logical circuit in which an output voltage appears in response to an input signal in accordance with the occurrence or concurrence of conditions established within the circuit.

In digital computers and data processing equipment in which information is handled by means of electrical signals representing digital values, it is well known to employ cricuits which control the path of an electrical current or generate a signal in accordance with the occurrence and concurrence of conditions established within the circuit. By means of a combination of such circuits, computations or manipulations may be performed in accordance with a logical system. Accordingly, the circuits are known as "logical circuits."

In a co-pending United States patent application entitled "Superconductive Electrical Circuits," filed June 5, 1957, Serial No. 663,668, in the name of Eugene C. Crittenden, Jr., there is described an electrical circuit constructed of superconductive materials which is capable of sustaining a persistent circulating current flow around a loop indefinitely so long as the entire circuit remains superconducting. By virtue of the capability of the circuit loop in sustaining a current, a device may be constructed for storing information as a function of the direction of persistent current flow, with the direction of current flow being ascertainable by applying a sensing pulse to the loop which renders a portion of the loop electrically resistive when the sensing pulse is additive with respect to the persistent flow through that portion. Thus, to read the stored information, a sensing pulse may be applied to the loop and the appearance of a voltage across the electrically resistive portion indicates a persistent circulating current in one direction while the absence of a voltage pulse indicates that the direction of persistent current flow is in the opposite direction.

With a combination of logical circuits and information storage circuits, a complete data processing system may be constructed in which information and instructions may be stored, manipulated or subjected to computations. Accordingly, it is one object of the present invention to provide a new and improved logical circuit including superconductive components for use in data processing systems.

It is another object of the present invention to provide a new and improved electrical circuit using superconductive components which function to generate a signal in accordance with the occurrence or concurrence of conditions established within the circuit.

It is an additional object of the present invention to provide a new and improved logical circuit in which at least one superconductive circuit loop functions to control the overall operation of the circuit in accordance with conditions established therein.

Briefly, in accordance with the invention, an electrical circuit includes at least one superconductive circuit, at least a portion of which is capable of being rendered electrical resistive in response to current flow in excess of a predetermined critical current value, means for establishing condition representing currents through the superconductive circuit, and means applying an input signal to the superconductive circuit whereby a voltage appears across a portion of the superconductive circuit in accordance with a predetermined logical relationship between the input signal and the condition representing currents.

In one particular embodiment a plurality of superconductive circuit loops or a single superconductive circuit loop and a plurality of setting means are connected in a configuration which performs the function of an "Or" circuit in which a voltage is generated whenever one of several alternative conditions is established. In another particular embodiment, a plurality of superconductive circuit loops are connected in a configuration which performs the function of an "And" circuit, in which an output voltage is generated in response to the concurrence of several conditions.

A better understanding of the invention may be had from a reading of the following detailed description and an inspection of the drawings, in which.

At temperatures near absolute zero, some materials lose all resistance to the flow of electrical current and become perfect conductors. The phenomenon is called superconductivity and the temperature at which the change occurs from a normally resistive state to a superconductive state is called the transition temperature. It has been established that where a material is held at a temperature below its transition temperature the superconductive state may be extinguished by the application of an external magnetic field to the material or by current flow through the material in an amount in excess of a critical current value. A discussion of the phenomenon of superconductivity and many of the materials which are capable of becoming superconductive may be found in a book entitled "Superconductivity" by D. Schoenberg, Cambridge University Press, Cambridge, England, 1952, and in the aforesaid co-pending application of Eugene C. Crittenden, Jr.

Figure 1:
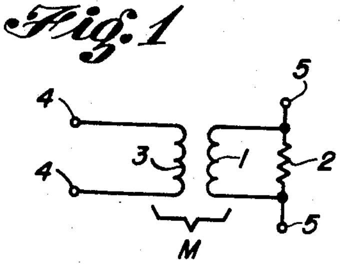
Fig. 1 is a schematic circuit diagram of a superconductive circuit loop which may be used in the electrical circuits of the invention.

Fig. 1 illustrates one type of electrical circuit loop described in the aforesaid co-pending application which is adapted to operate in accordance with the foregoing principles. The circuit of Fig. 1 includes a first conductor in the form of an inductance 1 and a second conductor in the form of a resistance element 2 connected to form a circuit loop. Both the inductance 1 and the resistance element 2 are constructed of materials which are superconductive at the operating temperature of the circuit. However, the resistance element 2 is constructed of a material having a critical current value at which the material switches from a superconductive state to a resistive state lower than the critical current value at which the inductance 1 switches from a superconductive state to a resistive state.

In operation, the electrical circuit of Fig. 1 is held at an operating temperature below the transition temperatures for both the resistance element 2 and the inductance 1. Since the material for the resistance element 2 is selected to have a critical current value lower than the critical current value of the material of the inductance 1, the entire circuit loop is superconductive for current flow less than the critical current value of the resistance element 2. Accordingly, no electrical resistance is presented to current flow less than the critical current value of the resistance element 2 and once such a current is established the current flows indefinitely. Thus, a persistent circulating current may be established in the circuit loop which will continue to flow so long as the inductance 1 and the resistance element 2 remain superconducting. However, since the resistance element 2 has a critical current value lower than that of the inductance 1, the resistance element 2 is subject to being made electrically resistive by a current flowing around the loop without affecting the superconductive state of the inductance 1 where the value of the current is in excess of the critical current value of the resistance element 2 and is lower than the critical current value of the inductance 1.

In the arrangement of Fig. 1, an electrical pulse for initiating a persistent circulating current may be applied to the circuit loop via an energizing coil 3. The bracket and the symbol "M" indicate that the inductance 1 and the coil 3 are mutually coupled so that a pulse applied to the terminals 4 is induced in the inductance 1. If the pulse appearing across the inductance 1 is sufficiently large to produce a current around the circuit loop in excess of the critical current value of the resistance element 2, the current within the circuit loop decays after the pulse disappears to a level approximately equal to or slightly less than the critical current value of the resistance element 2. At this point, the resistance element 2 switches from an electrically resistive state to a superconductive state and the current continues to flow around the circuit loop as a persistent circulating current so long as the resistance element 2 and the inductance 1 remain superconducting. Therefore, information may be stored in the circuit loop of Fig. 1 as a function of the direction of persistent circulating current flow by applying a pulse to the terminals 4 of a selected polarity.

In order to sense the direction of current flow within the circuit loop, a current pulse may be applied to a pair of terminals 5. Where the current pulse applied to the terminals 5 is additive with respect to a persistent circulating current flow through the resistance element 2, the total amount of current becomes sufficiently large to render the resistance element 2 electrically resistive so that a voltage appears at the terminals 5. As a result of the voltage across the resistance element 2, the direction of persistent circulating current flow within the circuit loop is reversed. Thus, after the voltage appears a persistent circulating current flows around the circuit loop in a direction opposite to the direction of persistent circulating current flow prior to the application of the pulse to the terminals 5. On the other hand, a pulse applied to the terminals 5 causing a current flow which is subtractive with respect to the persistent circulating current flowing through the resistance element 2 does not render the resistance element 2 electrically resistive so long as the net current flow does not exceed the critical current value of the resistance element 2. Accordingly, no voltage appears across the resistance element 2 in the latter case and the persistent circulating current in the circuit loop continues to flow in the same direction as before. Thus, by applying a pulse to the terminals 5, the direction of persistent circulating current flow may be ascertained by the presence or absence of a voltage across the resistance element 2.

Figure 2:
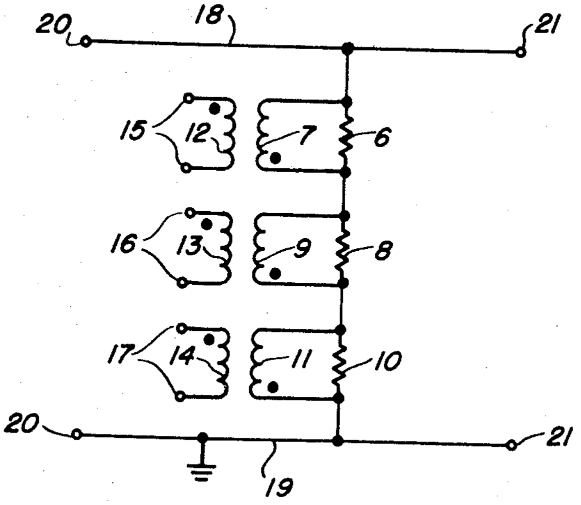
Fig. 2 is a schematic circuit diagram of a logical "Or" circuit in accordance with the invention.

In Fig. 2 there is shown a logical circuit in accordance with the invention which includes three superconductive circuit loops similar to the one shown in Fig. 1. One of the superconductive loops includes a resistance element 6 and an inductance 7, a second of the circuit loops includes a resistance element 8 and an inductance 9, and a third of the circuit loops includes a resistance element 10 and an inductance 11. Coupled to each of the circuit loops is an energizing coil 12, 13 and 14. The black dots adjacent the ends of each of the coils 7, 9, 11, 12, 13 and 14 indicate the relative polarity of the coupling in conventional fashion.

Accordingly, an electrical pulse applied to a pair of terminals 15 connected across the energizing coil 12 induces a voltage across the inductance 7 in a direction opposite to the polarity of the electrical pulse. In a similar fashion, electrical pulses applied to a pair of terminals 16 associated with the energizing coil 13 and electrical pulses applied to a pair of terminals 17 associated with the energizing coil 14 produce voltages of opposite polarity across the inductances 9 and 11, respectively.

In the circuit of Fig. 2 the resistance elements 6, 8 and 10 are connected serially between an upper conductor 18 and a lower conductor 19. In operation, a readout current may be applied to the input terminals 20 and an output voltage may appear at the output terminals 21 in accordance with the directions of the persistent current flowing in the superconductive loops of the resistance elements 6, 8 and 10 and the inductances 7, 9 and 11.

The circuit of Fig. 2 is adapted to function as a logical "Or" circuit in which a pulse of a selected polarity applied to any one of the terminals 15, 16 and 17 establishes a condition whereby a readout current applied to the terminals 20 produces an output voltage at the terminals 21.

As described in detail above with respect to Fig. 1, an electrical pulse applied to an energizing winding causes a persistent circulating current to flow in an associated superconductive circuit loop in a direction corresponding to the polarity of the electrical pulse. In Fig. 2 where a read current applied to the terminals 20 is subtractive with respect to the persistent currents flowing through all of the resistance elements 6, 8 and 10, the read current is free to pass through the resistance elements 6, 8 and 10 without exceeding the critical current values and without rendering any of the resistance elements 6, 8 and 10 electrically resistive. On the other hand, where an electrical pulse of a suitable polarity is applied to any one or more of the terminals 15, 16 and 17 to establish a persistent current through one or more of the resistance elements 6, 8 and 10 in a direction which is additive with respect to the direction of the read current applied to the terminals 20, the total current flowing through the resistance elements 6, 8 and 10 equals the persistent current plus the read current. Where the total exceeds the critical current value of one or more of the resistance elements 6, 8 and 10, the element or elements are rendered electrically resistive. When one of the resistance elements 6, 8 and 10 is rendered electrically resistive, the current flowing therethrough generates a voltage in accordance with the principles of Ohm's law. For example, a set pulse of negative polarity applied to the terminals 15 produces a persistent current flow through the resistance element 6 which is additive with respect to a read current of positive polarity applied to the terminals 20 and a voltage of positive polarity appears across the resistance element 6 in response to the read current.

Thus, by sensing the appearance or lack of appearance of a voltage at the terminals 21 in response to a read current applied to the terminals 20, the circuit functions as a logical "Or" circuit which provides an output signal whenever a set pulse has been applied to any one pair or more of the terminals 15, 16 and 17 to establish persistent current flow which is additive with respect to the read current.

Where the additive current condition established by the terminals 15 is labeled A, the additive current condition established by the terminals 16 is labeled B, the additive current condition established by the terminals 17 is labeled C and an output voltage at the terminals 21 is labeled D, the following logical equation corresponds to the function of the circuit of Fig. 2:

$$D=A+B+C$$

Figure 3:
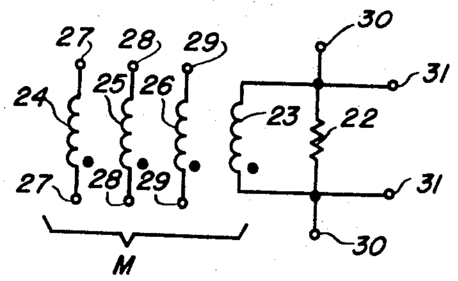
Fig. 3 is a schematic circuit diagram of another logical "Or" circuit in accordance with the invention.

Fig. 3 shows an electrical circuit which is adapted to function as a logical "Or" circuit in a manner similar to that described above with respect to Fig. 2. The circuit of Fig. 3 includes a single superconductive circuit loop including a resistance element 22 and an inductance 23. Coupled to the inductance 23 are three separate set windings 24, 25 and 26. The bracket with the letter "M" indicates that mutual coupling exists between all of the coils 24—26 and the inductance 23, and the black dots indicate the polarity of the coupling in conventional fashion.

In Fig. 3, an electrical pulse applied to any of the pairs of terminals 27, 28 or 29 associated with the energizing coils 24, 25 or 26, establishes a persistent circulating current flow around the superconductive loops of the resistance element 22 and the inductance 23 in a fashion similar to that described above with respect to Fig. 1. A read current may be applied to the circuit of Fig. 3 by means of the input terminals 30, and where the direction of the read current is additive with respect to the persistent circulating current flow established through the resistance element 22, an output voltage appears at the output terminals 31. Since a pulse applied to any one of the pairs of terminals 27—29 of a proper polarity establishes a persistent circulating current through the resistance element 22 in a direction which is additive with respect to the read current applied to the terminals 30, the circuit as a whole functions as a logical "Or" circuit.

Where the additive current condition established by an electrical pulse applied to the terminals 27 is designated A, the additive current condition established by an electrical pulse applied to the terminals 28 is designated B, the additive current condition established by an electrical pulse applied to the terminals 29 is designated C, and the output pulse appearing at the output terminals 31 is designated D, the logical equation corresponding to the function of the circuit of Fig. 3 is $$D=A+B+C$$

Although the circuits of Figs. 2 and 3 have been described as being adapted to function as logical "Or" circuits in which the occurrence of any one of several additive current conditions produces an output voltage in response to a read current, the identical circuit may be employed as a logical "And" circuit where the lack of appearance of a voltage pulse at the output indicates a concurrence of subtractive current conditions established within the circuit. That is, where all the persistent currents flowing within the circuit are subtractive with respect to the read current, no output voltage occurs, thereby indicating a concurrence of conditions. Accordingly, where D′ indicates the absence of the appearance of an output voltage, and A′, B′ and C′ each indicate the application of signals which result in a subtractive persistent circulating current flow in all of the several loops of Fig. 2, or in the single loop of Fig. 3, the following logical equation corresponds to the function of the circuits of Figs. 2 and 3:

$$D'=A'\cdot B'\cdot C'$$

Figure 4:
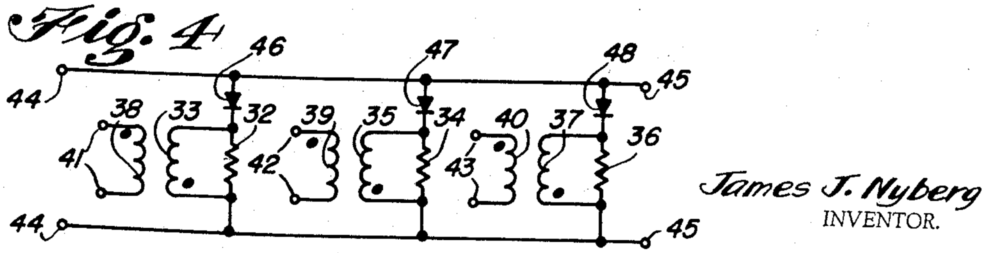
Fig. 4 is a schematic circuit diagram of a logical "And" circuit in accordance with the invention.

In Fig. 4 there is shown an electrical circuit in accordance with the invention which is adapted to function as a logical "And" circuit. The circuit of Fig. 4 includes three superconductive circuit loops similar to that described above in connection with Fig. 1. A first of the circuit loops includes a resistance element 32 and an inductance 33, a second of the circuit loops includes a resistance element 34 and an inductance 35, and a third of the circuit loops includes a resistance element 36 and an inductance 37. An energizing coil 38 is coupled to the superconductive circuit loop of the inductance 33, an energizing coil 39 is coupled to the inductance 35, and an energizing coil 40 is coupled to the inductance 37. Electrical pulses to establish conditions of persistent circulating current flow in the various superconductive loops of Fig. 3 may be applied to the pairs of terminals 41, 42 and

43. Each of the energizing coils 38—40 is coupled to one of the inductances 33—37 in the polarity indicated by the black dots. Connected serially with each of the superconductive circuit loops of Fig. 4 are the diodes 46, 47 and 48 which function to isolate each of the superconductive circuit loops.

In operation, a read current may be applied to a pair of input terminals 44 and an output voltage appears across the output terminals 45 whenever the conditions of persistent circulating current flow in all of the superconductive circuit loops are such that the read current is additive with respect to the persistent circulating current flow through all of the resistance elements 32, 34 and 36. Where any one of the superconductive circuit loops is set to a condition in which the read current applied to the input terminals 34 is subtractive with respect to the persistent circulating current flow through one of the resistance elements 32, 34 or 36, the read current is free to pass through one of the resistance elements without rendering that resistance element electrically resistive.

By virtue of the diodes 46, 47 and 48, no single voltage pulse appearing across any one of the resistance elements 32, 34 or 36 is capable of affecting the functioning or direction of persistent circulating current flow in any other one of the superconductive circuit loops.

Therefore, with a path of substantially zero resistance available for the read current, none of the resistance elements 32, 34 and 36 is rendered substantially resistive and no output voltage appears across the terminals 45.

Accordingly, the circuit of Fig. 4 functions as a logical "And" circuit in which an output voltage appears at the terminals 45 only if electrical pulses have been applied to all of the pairs of terminals 41, 42 and 43 of a proper polarity to establish persistent circulating currents through all the resistance elements 32, 34 and 36 which are additive with respect to the signal applied to the input terminals 44. Where the additive current condition established by the electrical pulse applied to the terminals 41 is designated A, the additive current condition established by an electrical pulse applied to the terminals 42 is designated B, the additive current condition established by an electrical pulse applied to the terminals 43 is designated C, and the output voltage appearing at the terminals 45 is designated D, the operation of the circuit of Fig. 4 is given in the form of a logical equation as follows:

$$D=A\cdot B\cdot C$$

Although the circuit of Fig. 4 has been described as being adapted to function as a logical "And" circuit in which the occurrence of all of several additive current conditions produces an output voltage in response to a read current, the identical circuit may be employed as a logical "Or" circuit where the lack of an appearance of a voltage pulse at the output indicates the occurrence of any one of several subtractive current conditions within the circuit. That is, where the direction of persistent current flow within any one of the circuit loops is subtractive with respect to the read current, no output voltage occurs. Accordingly, where D′ indicates the lack of an output voltage and A′, B′, and C′ each indicate conditions represented by subtractive current flow, a logical equation corresponding to the circuit of Fig. 4 is:

$$D'=A'+B'+C'$$

Although logical circuits have been illustrated in Figs. 2–4 in which a voltage appears in accordance with the occurrence or concurrence of a particular number of conditions within the circuit, it will be appreciated that the circuits may be readily adapted and combined to function as logical circuits in accordance with any number of desired conditions by modifying the number of superconductive loops or the number of energizing coils. In addition, it is intended that the illustrative circuits be considered as exemplary only of simple forms of logical circuits in accordance with the invention. More complex logical functions may be readily performed through a suitable combination or modification of the exemplary circuits without departing from the invention.

The construction of circuit loops for use in the circuits of Figs. 1–4 is described in detail in the aforementioned co-pending application of Eugene C. Crittenden, Jr. One such arrangement includes an insulated carrier on one side of which is supported a strip of a suitable material forming a resistance element, as for example, a strip comprising an evaporated metal film. For convenience, the material of the resistance element may be extended to form terminal portions which electrically connect with an inductance element comprising several turns of wire. Although any materials having the capacity of being rendered superconducting and having the correct relationship of critical current values may be used for the resistance element and the inductance, one suitable material for the inductance wire is lead. Where lead is selected for the inductance wire, examples of suitable materials for the resistance element are tantalum, tin, or alloys thereof.

An alternative arrangement of a circuit loop may be constructed by printed circuit techniques in which suitable materials are supported by an insulating carrier in a spiral conductor to form an inductance and a strip to form a resistance element. The spiral conductor may be connected across the resistance element to form a circuit loop.

In practice, it has been found that the presence of a certain amount of inductance in the resistance element does not adversely affect the operation of the circuit, and the value of the inductance does not have to be large. Therefore, the inductance may be provided by distributed inductance in any part of the circuit loop. For example, a circuit loop may be constructed including a first conductor of a superconductive material having a given critical current value and a second conductor having a given critical current value differing from the given critical value of the first conductor. Thus, one of the conductors may be rendered electrically resistive in response to current flow in excess of its critical current value without affecting the superconductive condition of the other conductor. Accordingly, conventional schematic circuit diagram symbols for the inductances and resistance elements in the schematic circuit diagrams of Figs. 1–4 have been used for convenience and for purposes of explanation and do not necessarily indicate the presence of conventional components.

One suitable arrangement for maintaining the circuits of the invention at a proper operating temperature below the transition temperatures of the superconductive materials employed includes an exterior insulated container which is adapted to hold a coolant such as liquid hydrogen. Within the container an inner insulated container is suspended for holding a coolant, such as liquid helium in which the circuits are immersed. Where the inductance is constructed of lead and the resistance element is constructed of tantalum, a suitable operating temperature is 4.2° Kelvin which is the boiling point of helium. Other suitable operating temperatures may be obtained by regulating the vapor pressure within the helium container.

In order to enhance the magnetic field generated by currents flowing within the circuit, and hence reduce the switching time required to establish a persistent current in a given direction or to reverse the direction of persistent current flow, the conductors may be made in other than a cylindrical cross section. For example, where an evaporated layer is used for the resistance element, the element may comprise a relatively thin strip which leads to an increased strength of internal magnetic field produced by a given current which in turn lowers the critical current value and decreases the switching time. In addition, the switching time can be decreased by alloying the material with small concentrations of other chemical elements. Suitable alloying elements, for example, in the case of tin are antimony and indium. Both of these elements form solid solutions with tin so that the antimony or indium atoms are randomly scattered through the tin crystals, with the antimony or indium atoms substituting for tin atoms in the crystal lattice. Both antimony and indium differ by unity in valence from tin so that they scatter the electron waves in the tin by coulomb scattering. Hence, they contribute a large electrical resistivity per atom percent addition.

Although the following values are given by way of example only, it has been found that the value of the inductance may be of the order of 1 microhenry and the value of the resistance element in a resistive condition may be of the order of .5 ohm. Workable circuit loops for sustaining persistent current and for rapid switching have been constructed in which the physical dimensions of a strip of tin for the resistance element were as follows:

| | |
|---|---|
| Thickness | $3.4\times10^{-5}$ centimeters; $10.2\times10^{-5}$ centimeters. |
| Width | 0.27 to 0.18 centimeter. |
| Length | .635 centimeter. |

The value of the inductance should be large enough so that the time constant for decay of circulating current $$\frac{L}{R}$$

when the resistance element is not superconducting is about as large as or larger than the delay times required for the resistance element to change from resistive to superconducting and vice versa. For a given delay time, the value of the inductance then depends upon the value of the resistance element and thus a smaller resistance will permit a smaller inductance and a consequent smaller space required for the inductance. The value of the resistance element should be large enough to generate a suitable voltage pulse but should not be so large as to generate substantial amounts of heat or require substantial amounts of power to switch the device from one mode of operation to the other.

Although the condition of a material while superconducting has been described herein as being a condition of zero resistance, it will be appreciated that a small amount of resistance may be present in the superconductive condition of a material which does not necessarily affect the operation of the circuit. Accordingly, the invention should not be limited by any particular words which have been used to explain the theory of operation.

The superconductive circuit loops and energizing coils illustrated in the apparatus of Figs. 2–4 are given as one example of a preferred arrangement for establishing currents within the superconductive components. However, the invention is not limited thereto, since suitable currents may be derived or established from external sources such as a power supply or from other equivalent electrical circuits. For example, in place of the inductances 7, 9 and 11 and the energizing coils 12, 13 and 14 of Fig. 2, separate sources of control current may be connected to the resistance elements 6, 8 and 10.

In view of the above, the invention should be accorded the full scope of the annexed claims including the particular embodiments illustrated in the drawings and described herein as well as all equivalents thereof.

What is claimed is:

1. A logical circuit including the combination of a first conductor, a second conductor, a plurality of superconductive circuit elements connected between the first and second conductors, each of said superconductive elements being capable of being rendered electrically resistive in response to current flow therethrough in excess of a predetermined critical current value, means for establishing through each of the superconductive elements a current less than the critical current value in response to each of several separate conditions, and means for applying a read current to the first and second conductors whereby a voltage pulse appears between the conductors whenever the sense of the read current is additive with respect to the sense of the currents established in any one of the superconductive circuit elements.

2. A logical circuit including the combination of a first conductor, a second conductor, a plurality of superconductive devices connected between the first and second conductors in parallel, each of which is capable of being switched from a superconductive state to a resistive state in response to current flow in excess of a predetermined critical current value, a plurality of setting means for establishing a condition representing current in each of the superconductive devices of less than the critical current value, and means for applying a read current to the first and second conductors whereby an output voltage is produced across the first and second conductors whenever like predetermined conditions of current flow have been established in the superconductive devices in a direction which is additive with respect to the direction of the read current.

3. A logical circuit including the combination of a first conductor, a second conductor, a plurality of superconductive paths between the first and second conductors, each of which is capable of being switched from a superconductive state to a resistive state in response to current flow in excess of a predetermined critical current value, a plurality of setting means for establishing current flow through each of the superconductive paths of less than the critical current value in response to external conditions, and means for applying a read current to the first and second conductors whereby an output voltage appears across the first and second conductors whenever the read current is additive with respect to the currents established through all of the superconductive paths in accordance with the external conditions.

4. A logical circuit including the combination of a first conductor, a second conductor, a plurality of superconductive circuit elements connected in parallel between the first and second conductors, each of said superconductive elements being capable of being rendered electrically resistive in response to current flow therethrough in excess of a predetermined critical current value, means for establishing through each of the superconductive elements a current less than the critical current value in response to each of several separate condiitons, and means for applying a read current to the first and second conductors whereby a voltage pulse appears between the conductors whenever the sense of the read current is additive with respect to the sense of the condition representing currents esablished in all of the superconductive circuit elements.

5. A logical circuit including the combination of a first conductor, a second conductor, a plurality of superconductive devices connected serially between the first and second conductors, each of said superconductive devices being capable of being switched from a superconductive state to a resistive state in response to current flow in excess of a predetermined critical current value, a plurality of setting means for establishing individual currents through each of the superconductive devices representing each of several conditions, and means for applying a read current to the first and second conductors whereby an output voltage appears across the conductors whenever the read current is additive with respect to at least one of the currents established through the superconductive devices in accordance wtih any one of the several conditions.

6. A logical circuit including the combination of a plurality of superconductive circuit loops connected serially, each of said circuit loops including a portion which is capable of being switched from a superconductive state to a resistive state in response to current flow in excess of a predetermined critical current value, a plurality of separate setting means associated with each of the superconductive circuit loops for establishing within each of the circuit loops a persistent circulating current flow having a value less than said predetermined critical current value, and means for applying a read current to all of the superconductive circuit loops whereby an output voltage appears across at least one of the loops whenever the read current is additive with respect to a persistent circulating current through the portion of the loop which is capable of being rendered electrically resistive.

7. A logical circuit including the combination of a first conductor, a second conductor, a plurality of superconductive circuit loops connected serially between the first and second conductors, each of said circuit loops including an inductance and a resistance element, said resistance element being capable of being switched from a superconductive state to a resistive state in response to current flow therethrough in excess of a predetermined critical current value, a plurality of separate setting coils, each of which is inductively coupled to the inductance of one of the superconductive loops for establishing persistent circulating current flow in selected ones of the circuit loops in accordance with signals applied to the setting coils, and means applying a read current to the first and second conductors whereby a voltage appears across the conductors whenever the sense of the read current is additive with respect to the sense of the persistent circulating currents established through any one of the resistance elements of the superconductive loops.

8. A logical circuit including the combination of a first conductor, a second conductor, a plurality of superconductive circuit loops connected in parallel between the first and second conductors, each of the circuit loops containing at least a portion which is capable of being switched from a superconductive state to a resistive state in response to current flow in excess of a predetermined critical current value, a plurality of setting means associated with each of the superconductive circuit loops for establishing a condition representing persistent circulating current flow within each of the circuit loops of less than critical current value, and means for applying a read current to the first and second conductors whereby a voltage pulse appears between the conductors whenever the sense of the read current is additive with respect to the sense of all of the currents established within the portions of the superconductive loops which are capable of being rendered electrically resistive.

9. A logical circuit including the combination of a first conductor, a second conductor, a plurality of superconductive circuit loops connected in parallel between the first and second conductors, each of said superconductive circuit loops including a resistance element which is capable of being rendered electrically resistive in response to current flow therethrough in excess of a predetermined critical current value, a plurality of setting coils, each of which is inductively coupled to one of the superconductive circuit loops for establishing persistent circulating current flow in the loop to which it is coupled in a selected direction corresponding to an external condition, and means applying a read current to the first and second conductors whereby a voltage pulse appears between the conductors whenever the sense of the read current is additive with respect to the sense of the currents established in all of the resistance elements.

10. A logical circuit including the combination of a first conductor, a second conductor, a plurality of superconductive circuit loops connected in parallel between the first and second conductors, each of said superconductive circuit loops including an inductance and a resistance element, said resistance element being capable of being switched from a superconductive state to a resistive state in response to current flow therethrough in excess of a predetermined critical current value, a plurality of setting coils, each of which is coupled to one of the inductances of the superconductive loops for establishing persistent circulating currents within the loops in selected directions in accordance with external conditions, and means for applying a read current to the first and second conductors whereby a voltage pulse appears between the conductors whenever the sense of the read current is additive with respect to the sense of the current established through all of the resistance elements of the superconductive loops.

11. A logical circuit including the combination of a first conductor, a second conductor, plurality of superconductive circuit loops connected in parallel between the first and second conductors, each of the circuit loops containing at least a portion which is capable of being switched from a superconductive state to a resistive state in response to current flow in excess of a predetermined critical current value, a plurality of setting means associated with each of the superconductive loops, for establishing a condition representing persistent circulating current flow within each of the circuit loops of less than critical current value, a plurality of unidirectional conduction devices, one of which is connected serially with each of the superconductive circuit loops, and means for applying a read current to the first and second conductors whereby a voltage pulse appears between the conductors whenever the sense of the read current is additive with respect to the sense of all of the currents established within the portions of the superconductive loops which are capable of being rendered electrically resistive.

12. A logical circuit including the combination of a first conductor, a second conductor, a plurality of superconductive circuit loops connected in parallel between the first and second conductors, each of said superconductive circuit loops including a resistance element which is capable of being rendered electrically resistive in response to current flow therethrough in excess of a predetermined critical current value, a plurality of setting coils, each of which is inductively coupled to one of the superconductive circuit loops for establishing persistent circulating current flow in the loop to which it is coupled in a selected direction corresponding to an external condition, a plurality of unidirectional devices, one of which is connected serially with each of the superconductive circuit loops, and means applying a read current to the first and second conductors whereby a voltage pulse appears between the conductors whenever the sense of the read current is additive with respect to the sense of the currents established in all of the resistance elements.

13. A logical circuit including the combination of a first conductor, a second conductor, a plurality of superconductive circuit loops connected in parallel between the first and second conductors, each of said superconductive circuit loops including an inductance and a resistance element, said resistance element being capable of being switched from a superconductive state to a resistive state in response to current flow therethrough in excess of a predetermined critical current value, a plurality of setting coils, each of which is coupled to one of the inductances of the superconductive loops for establishing persistent circulating currents within the loops in selected directions in accordance with external conditions, a plurality of diodes, one of which is connected serially with each of the superconductive circuit loops, and means for applying a read current to the first and second conductors whereby a voltage pulse appears between the conductors whenever the sense of the read current is additive with respect to the sense of the current established through all of the resistance elements of the superconductive loops.

No references cited.